United States Patent
Dickson, Jr. et al.

(10) Patent No.: US 9,420,915 B2
(45) Date of Patent: Aug. 23, 2016

(54) BLENDING JAR WITH RIDGES

(71) Applicant: BlendTec, Inc., Orem, UT (US)

(72) Inventors: Thomas D. Dickson, Jr., Salt Lake City, UT (US); David J. Throckmorton, Mapleton, UT (US)

(73) Assignee: BLENDTEC, INC., Orem, UT (US)

( * ) Notice: Subject to any disclaimer, the term of this patent is extended or adjusted under 35 U.S.C. 154(b) by 0 days.

(21) Appl. No.: 14/298,903

(22) Filed: Jun. 7, 2014

(65) Prior Publication Data
US 2015/0282671 A1    Oct. 8, 2015

Related U.S. Application Data

(63) Continuation-in-part of application No. 29/486,923, filed on Apr. 3, 2014, now Pat. No. Des. 742,172.

(51) Int. Cl.
| | | |
|---|---|---|
| *B01F 13/00* | (2006.01) | |
| *B01F 7/00* | (2006.01) | |
| *A47J 43/046* | (2006.01) | |
| *B01F 7/16* | (2006.01) | |

(52) U.S. Cl.
CPC ............. *A47J 43/046* (2013.01); *B01F 7/1675* (2013.01)

(58) Field of Classification Search
CPC .............................. A47J 43/046; B01F 7/1675
USPC .................................................. 366/205, 306
See application file for complete search history.

(56) References Cited

U.S. PATENT DOCUMENTS

| | | | |
|---|---|---|---|
| D163,117 S |  | 5/1961 | Hobbs |
| 3,175,594 A | * | 3/1965 | Jepson ................. A47J 43/046 241/199.12 |
| 3,368,800 A |  | 2/1968 | Bernard, Jr. |
| D227,535 S |  | 7/1973 | Grimes |
| D228,698 S |  | 10/1973 | Barnard et al. |
| 4,822,175 A |  | 4/1989 | Barnard et al. |
| D305,973 S |  | 2/1990 | Barnard et al. |
| D309,399 S |  | 7/1990 | Barnard et al. |
| D309,400 S |  | 7/1990 | Barnard |
| 4,946,287 A |  | 8/1990 | Barnard et al. |
| 5,102,015 A |  | 4/1992 | Barnard et al. |
| D336,590 S | * | 6/1993 | Barnard ......................... D7/376 |
| 5,302,021 A |  | 4/1994 | Jennett et al. |
| 5,323,973 A | * | 6/1994 | Ferrara, Jr. ............ A47J 43/046 366/205 |
| 5,655,834 A |  | 8/1997 | Dickson |
| D480,915 S |  | 10/2003 | Kolar et al. |
| D488,347 S |  | 4/2004 | Boozer et al. |
| D495,925 S |  | 9/2004 | Ulanski et al. |
| 6,811,303 B2 | * | 11/2004 | Dickson, Jr. ......... A47J 43/0716 366/205 |
| 6,979,117 B2 |  | 12/2005 | Dickson, Jr. |
| D521,315 S |  | 5/2006 | Boozer et al. |
| D521,316 S |  | 5/2006 | Katz et al. |

(Continued)

OTHER PUBLICATIONS

PCT International Search Report for International Application No. PCT/US2014/059084, mailed Jan. 14, 2015 (2 pp.).

*Primary Examiner* — Tony G Soohoo
*Assistant Examiner* — Anshu Bhatia
(74) *Attorney, Agent, or Firm* — Holland & Hart

(57) ABSTRACT

A blender jar with ridges has a bottom wall positioned below a movable blending member, a sidewall surface extending upward from the bottom wall, and a plurality of ridges extending inward from the sidewall surface. The ridges are positioned reflectively asymmetric relative to the mixing area in the jar. The ridges may improve blending consistency and uniformity, and may reduce blending time.

15 Claims, 9 Drawing Sheets

(56) References Cited

U.S. PATENT DOCUMENTS

| | | |
|---|---|---|
| 7,063,456 B2 | 6/2006 | Miller et al. |
| D528,363 S | 9/2006 | Ulanski et al. |
| D538,595 S | 3/2007 | White et al. |
| 7,267,478 B2 | 9/2007 | Miller et al. |
| 7,281,842 B2 | 10/2007 | Dickson, Jr. |
| 7,350,963 B2 | 4/2008 | Williams et al. |
| D587,526 S | 3/2009 | Barnard et al. |
| D588,406 S | 3/2009 | Ulanski |
| D621,656 S | 8/2010 | Ulanski et al. |
| D637,862 S | 5/2011 | Fouquet |
| D647,367 S | 10/2011 | Audette et al. |
| 8,109,668 B2 | 2/2012 | Garman et al. |
| D662,359 S | 6/2012 | Boozer et al. |
| D664,808 S | 8/2012 | Dickson et al. |
| D678,726 S | 3/2013 | Palermo et al. |
| D684,818 S | 6/2013 | Lee |
| 8,550,695 B2 | 10/2013 | Conti |
| D705,606 S | 5/2014 | Coakley et al. |
| 8,721,164 B2 | 5/2014 | Audette |
| 8,753,004 B2 | 6/2014 | Miller et al. |
| D709,326 S | 7/2014 | Thai |
| 2005/0122837 A1 | 6/2005 | Bravard et al. |
| 2005/0258197 A1 | 11/2005 | Rukavina et al. |
| 2006/0261066 A1 | 11/2006 | Boozer et al. |
| 2009/0238034 A1 | 9/2009 | Ulanski |
| 2012/0199682 A1 | 8/2012 | Lee et al. |

\* cited by examiner

BLENDING JAR WITH RIDGES

RELATED APPLICATION

This is a continuation-in-part of U.S. Design application Ser. No. 29/486,923, filed on 3 Apr. 2014, now U.S. Design Pat. No. D742,172, issued 3 Nov. 2015, the disclosure of which is incorporated, in its entirety, by this reference.

TECHNICAL FIELD

The following relates generally to blending devices, and more particularly to blending devices capable of high-volume, rapid-succession production of blended beverages.

BACKGROUND

Food processors and blending devices have existed for many years. One example of a blending device is shown and described in U.S. Pat. No. 5,655,834, which is incorporated in its entirety by this reference.

Food processors and blending machines are being used now more than ever, particularly in the high-volume, commercial beverage industry. People are increasingly becoming aware of the benefits, in terms of taste and quality, of well-processed beverages. Blended fruit smoothies and similar fruit drinks, popular with all types of people ranging from the fitness conscious to the less active, require a food processor or blending machine. Cold beverages, in particular, which utilize fruit (frozen or fresh) and ice to prepare present unique challenges in beverage preparation. An appropriate blending machine will break down the ice, fruit, and other ingredients in attempting to achieve an ideal uniform drink consistency. In addition, food processors or blending machines are ideal for mixing nutritional supplements into beverages while similarly attempting to achieve an ideal uniform drink consistency.

In addition to the recent increase in the popularity of smoothies, food processors and blending machines are being used to produce many new and different beverages. For example, different types of coffees, shakes, dairy drinks, and the like are now commonly served at many different types of retail business locations. Consumers are demanding more diversity and variety in the beverages available at these smoothie and other retail stores. The keys to producing a high quality beverage, irrespective of the specific type of beverage, are quality ingredients and a high quality blending machine that will quickly and efficiently blend the ingredients to produce a drink with uniform consistency.

One problem associated with businesses that depend on blending machines is the speed with which the beverage or drink is prepared. In the food preparation industry, time equals money. Beverages have traditionally been made by retrieving the appropriate ingredients, placing the ingredients inside a mixing container, and actuating a motor which drives a blade mounted inside the mixing container to blend the contents held within the mixing container. Traditionally, a thorough blending takes extra time, particularly for frozen ingredients and ice, since the ingredients must thoroughly circulate through the jar and into contact with the blade. Ingredients must make multiple circulations into the blade to be liquefied, whipped, or frapped before reaching an optimal, uniform consistency. Thus, maintaining constant circulation of ingredients into contact with the blade is a crucial factor in reducing blending time.

Many blenders also implement timed blending modes. Reducing the time needed to blend in each mode means smoothies and other foods can be served more quickly and to more consumers. Furthermore, improving the efficiency of the blending within a preset time may produce a smoother, less clumpy, and more fully mixed product.

In view of the foregoing, there is a need to provide blending devices and methods that will allow beverages to be made quickly and efficiently by minimizing the overall time required between ordering a beverage and serving the beverage to the consumer, whether for home or commercial chefs. There is also a need to provide blending devices and methods that will produce a beverage with an optimal, uniform consistency with respect to all desired ingredients.

SUMMARY

According to at least one embodiment, a blender for blending foodstuff is provided. The blender may comprise a blender base having a control interface, a motor mounted within the base, a blending jar, and a movable blending member or blade. The blending jar may have a lower end and a mixing area, with the lower end coupled to the blender base and the mixing area having a bottom wall and a sidewall. The sidewall may extend upward from the bottom wall and the sidewall may have ridges extending into the mixing area in reflectively asymmetric positions. The movable blending member may be positioned adjacent to the bottom wall of the blending jar and may be configured to rotate in response to rotation of the motor.

The sidewall may comprise four side walls forming a generally rectangular cross-section. The ridges may be asymmetrically positioned relative to a plane diagonally bisecting the generally rectangular cross-section. The ridges may be rotationally symmetric relative to a central vertical axis of the blending jar. The ridges may also be positioned off-center on the side walls or at different distances from a corner of the sidewall.

In some cases, the sidewall may further comprise a fifth truncated wall extending between two side walls of the sidewall, and the fifth truncated wall may be positioned closer to a central axis of the blending jar than to the corners of the generally-rectangular cross-section. The blending jar may further comprise a handle secured to the blending jar at the fifth truncated wall, and the ridges may be asymmetrically positioned relative to the fifth truncated wall.

In some cases, the sidewall has no more than two ridges. The plurality of ridges may also be rotationally asymmetric relative to a central vertical axis of the blending jar. The ridges may extend into the mixing area to a distance greater than or equal to a thickness of the sidewall, or may have a width greater than or about equal to a thickness of the sidewall. In some embodiments, the ridges are filleted relative to the mixing area. The ridges may extend upward along the sidewall from the bottom wall of the blending jar and terminate partway along a height of the mixing area. In some cases, the ridges may terminate at half of the height of the mixing area or less. The ridges may terminate at a height greater than or equal to a height of the movable blending member.

According to another embodiment, a ridged blender jar may be provided, comprising a bottom wall configured to be positioned below a movable blending member, a sidewall surface extending upward from the bottom wall, the bottom wall and sidewall surface forming a mixing area, and a plurality of ridges extending inward from the sidewall surface. The plurality of ridges may be positioned reflectively asymmetric relative to the mixing area.

The plurality of ridges may be rotationally symmetric relative to a central axis of the bottom wall. Some embodiments of the blender jar may have sidewall surface comprising four side walls extending from the bottom wall, wherein the four side walls form a generally rectangular cross-section. The sidewall may further comprise a fifth truncated wall disposed between two side walls of the sidewall surface, and the fifth truncated wall may be positioned closer to a central axis of the blender jar than corners of the generally rectangular cross-section.

In some embodiments, the blender jar may have the plurality of ridges extend along the sidewall surface from the bottom wall to a height less than half a total height of the mixing area, and the jar may have no more than two ridges. The plurality of ridges may be rotationally asymmetric relative to a central axis of the bottom wall. The ridges may extend into the mixing area to a distance greater than or equal to a thickness of the sidewall. The ridges may in some cases have a width greater than or about equal to a thickness of the sidewall, and may be filleted or tapered relative to the mixing area.

In another aspect of the present disclosure, a method of blending foodstuff using a ridged blending jar is provided, comprising at least: (i) providing a blender that includes a motor, a housing, a blending jar coupled to the housing, and a movable blending member or blade within the blending jar, with the blending jar having internal ridges asymmetrically protruding from an inner surface of the blending jar, (ii) depositing foodstuff into the blending jar of the blender, and (iii) blending the foodstuff within the blending jar using the blade assembly and motor such that, while blending, motion of at least some of the foodstuff is deflected or redirected by the ridges.

The method may include that at least some of the foodstuff is deflected or redirected in a reflectively asymmetric manner relative to the blending jar. The motion of the foodstuff may be deflected or redirected in a rotationally-symmetrical manner relative to the blending jar. In some cases, the motion of the at least some of the foodstuff may be deflected or redirected in a rotationally-asymmetrical manner relative to the blending jar. In some embodiments the foodstuff may not be deflected or redirected by the ridges along a portion of a height of the blending jar. In some cases, the motion of the at least some of the foodstuff may only be deflected or redirected by the ridges within a certain depth of the blending jar.

The blending jar in this method may comprise four side walls extending from a bottom wall that form a generally rectangular cross-section and a fifth truncated wall disposed between two of the four side walls. The fifth truncated wall may be positioned closer to a central axis of the blending jar than corners of the generally rectangular cross-section. Using this jar, the motion of the at least some of the foodstuff may be deflected or redirected by the fifth truncated wall.

The foregoing and other features, utilities and advantages of the invention will be apparent from the following more particular description of a preferred embodiment of the invention as illustrated in the accompanying drawings.

BRIEF DESCRIPTION OF THE DRAWINGS

The accompanying drawings and figures illustrate exemplary embodiments and are part of the specification. Together with the present description, these drawings demonstrate and explain various principles of this disclosure. A further understanding of the nature and advantages of the present invention may be realized by reference to the following drawings. In the appended figures, similar components or features may have the same reference label.

FIG. 3C also shows a blade assembly installed in the blender jar.

Figure 1A:
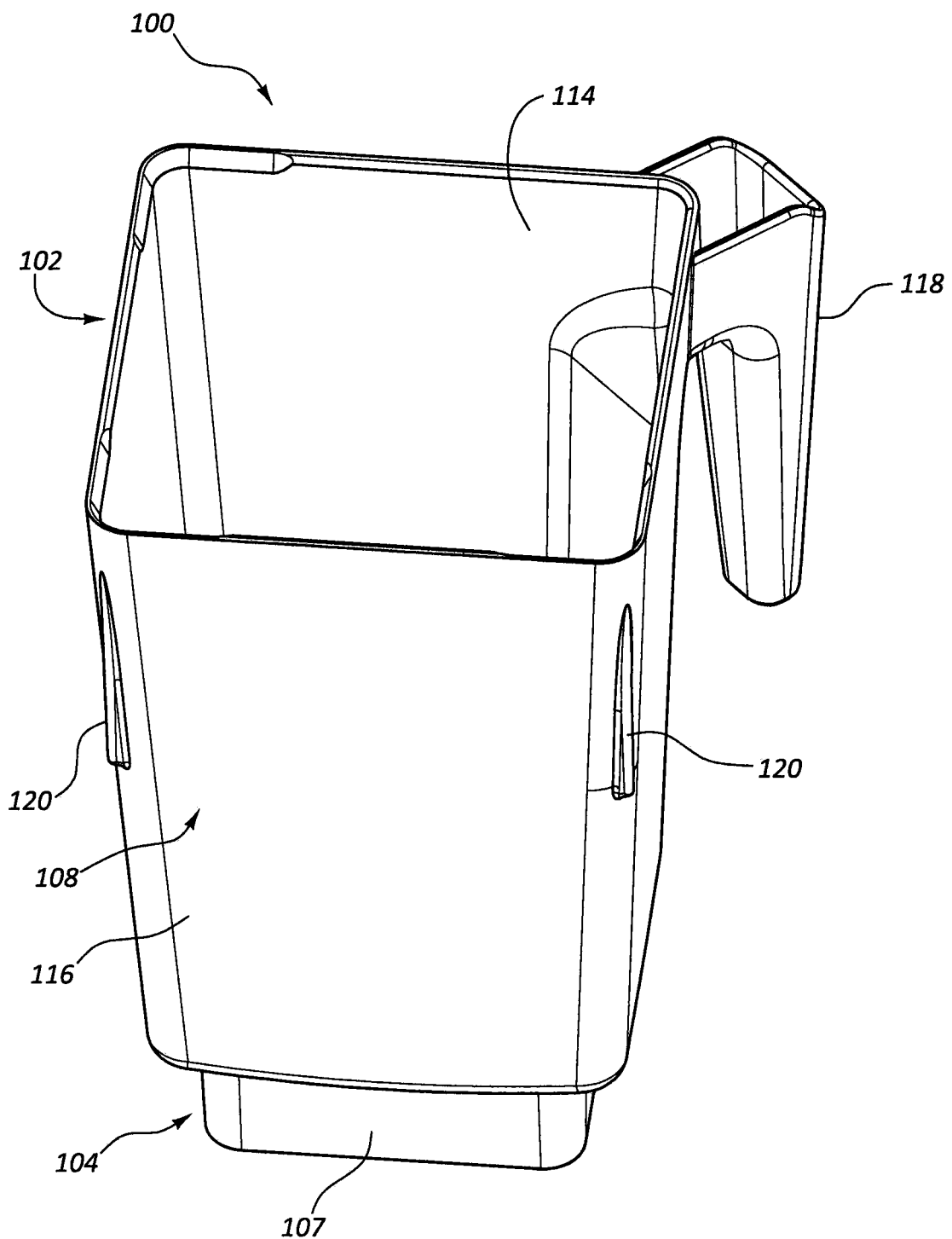
FIGS. 1A-1B show perspective views of a blender jar according to an embodiment of the present disclosure.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION

The present disclosure provides blending apparatuses, blender jars, and blending methods configured to more fully and efficiently blend ingredients into a smooth, optimal consistency. Currently, most blender jars are smooth on their internal surfaces or only have minor internal surface features (e.g., small alternating ridges and grooves or smoothed corners). Those configurations and designs allow foods within the jar to circulate freely while being blended. Some blender jars implement internal vertical ridges for various purposes, such as to allow the jars to be more easily stacked, to increase thickness of the jar for structural stability, or to alter the flow of liquefied ingredients as they are stirred and ground by a blending blade.

Relatively smooth blender jar surfaces often do not thoroughly mix ingredients due to some areas in the flow path of the volume of ingredients being less likely to be drawn into contact with the blending blade than others. This is particularly a problem in lower portions of the blending jar and especially in non-cylindrical blender jars. Ingredients with proximity to the underside of the blade, corners, or bottom wall of the jar can be relatively isolated from the vortex-like flow of ingredients produced by rotation of the blade. Jars with long, centrally-positioned internal vertical ridges may marginally improve the mixing efficiency of these problem areas by redirecting foodstuff from the problem areas, but these long ridges increase the cost of producing the jar, appreciably decrease the internal volume of the jar, make the jar harder to clean, and are often not effective enough at improving blending to balance out their drawbacks.

In at least one embodiment, the present disclosure is directed to a blending jar having internal ridges that significantly improve blending efficiency and minimize or eliminate spots in the jar that may cause low mixing effectiveness. Thus, using a blending jar of the present disclosure may reduce blending times required to reach a desired ingredient consistency, may reduce undesirable areas of poorly mixed ingredients, and may more thoroughly mix most ingredients within a predetermined time than blenders using conventional blender jars.

According to one embodiment, a blending jar is provided with a bottom wall and sidewall forming a mixing area. A plurality of ridges may extend inward from the sidewall. These ridges may be asymmetrically positioned on the sidewall in a manner that asymmetrically redirects or deflects foodstuff away from the sidewall. The ridged jars more effectively blend due at least in part to the asymmetry in the flow of the foodstuff, which may lead to improved flow turbulence and more interaction between the foodstuff and the blending blade. This may reduce blending times and/or improve the smoothness and uniformity of mixed ingredients.

In some cases, the ridges only partially extend upward along the height of the sidewall, thereby providing improved blending without sacrificing a large amount of internal volume or introducing additional undesirable surfaces that may be difficult to clean. Additional features and advantages of the embodiments of the present disclosure will be addressed in connection with the figures herein.

The present description provides examples, and is not limiting of the scope, applicability, or configuration set forth in the claims. Thus, it will be understood that changes may be made in the function and arrangement of elements discussed without departing from the spirit and scope of the disclosure, and various embodiments may omit, substitute, or add other procedures or components as appropriate. For instance, the methods described may be performed in an order different from that described, and various steps may be added, omitted, or combined. Also, features described with respect to certain embodiments may be combined in other embodiments.

Figure 1B:
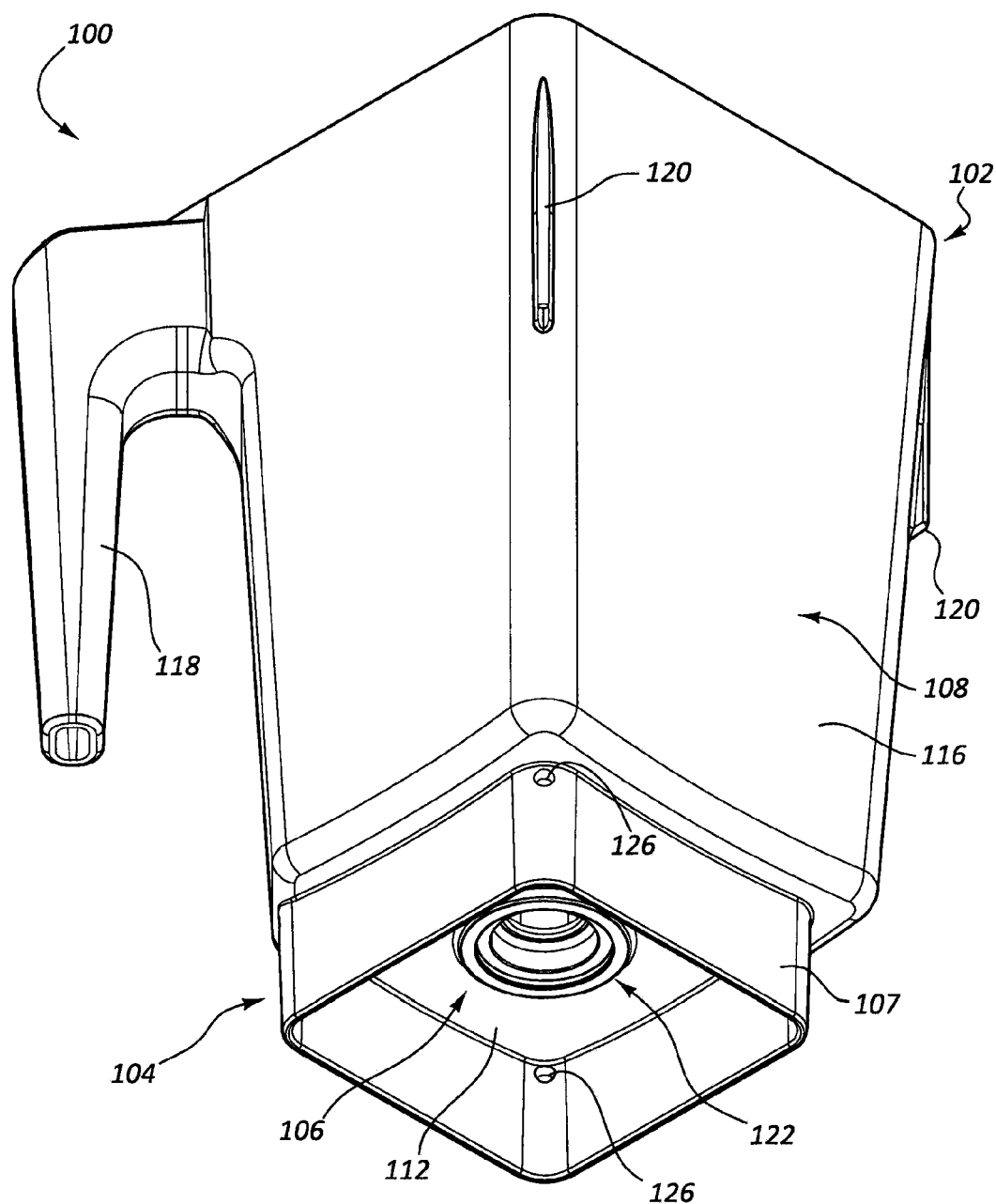
Figure 1C:
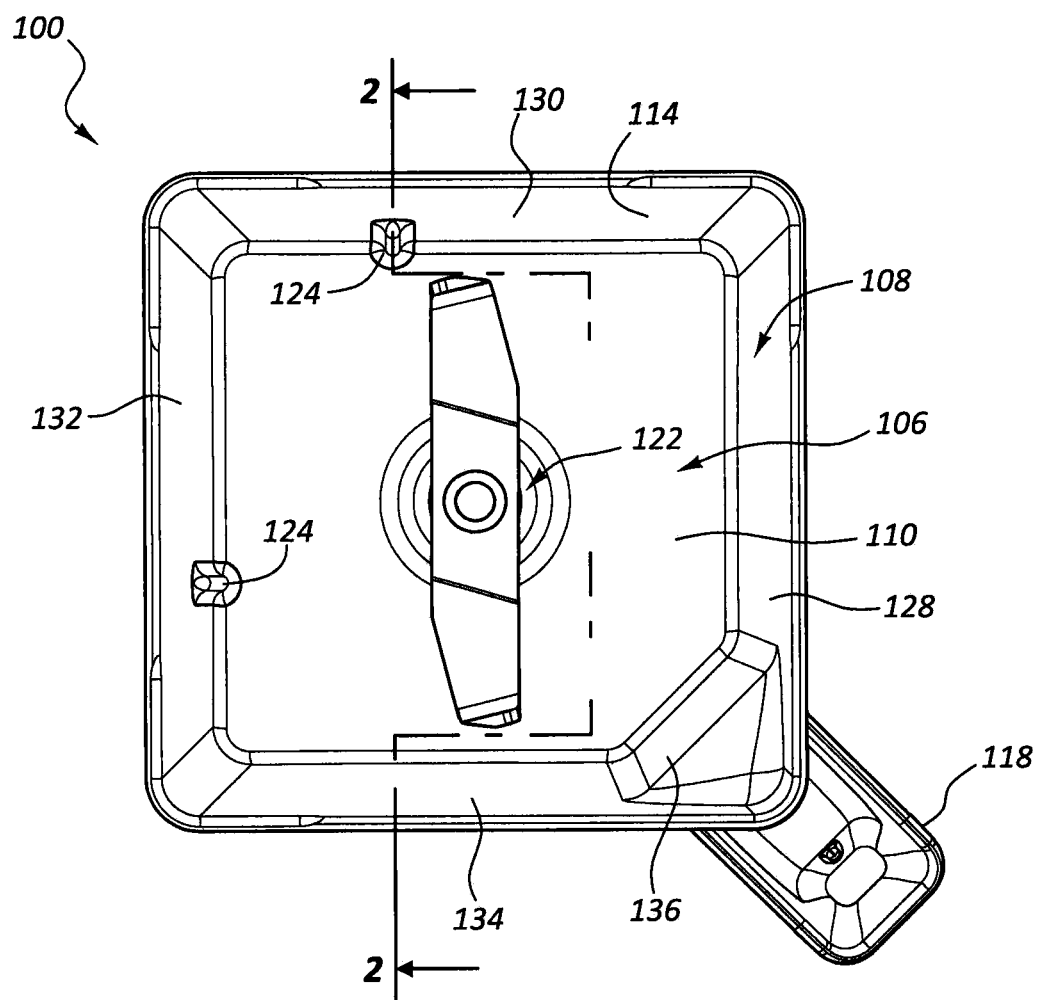
FIG. 1C shows a top view of a blender jar having a blade assembly according to an embodiment of the present disclosure.
Figure 1D:
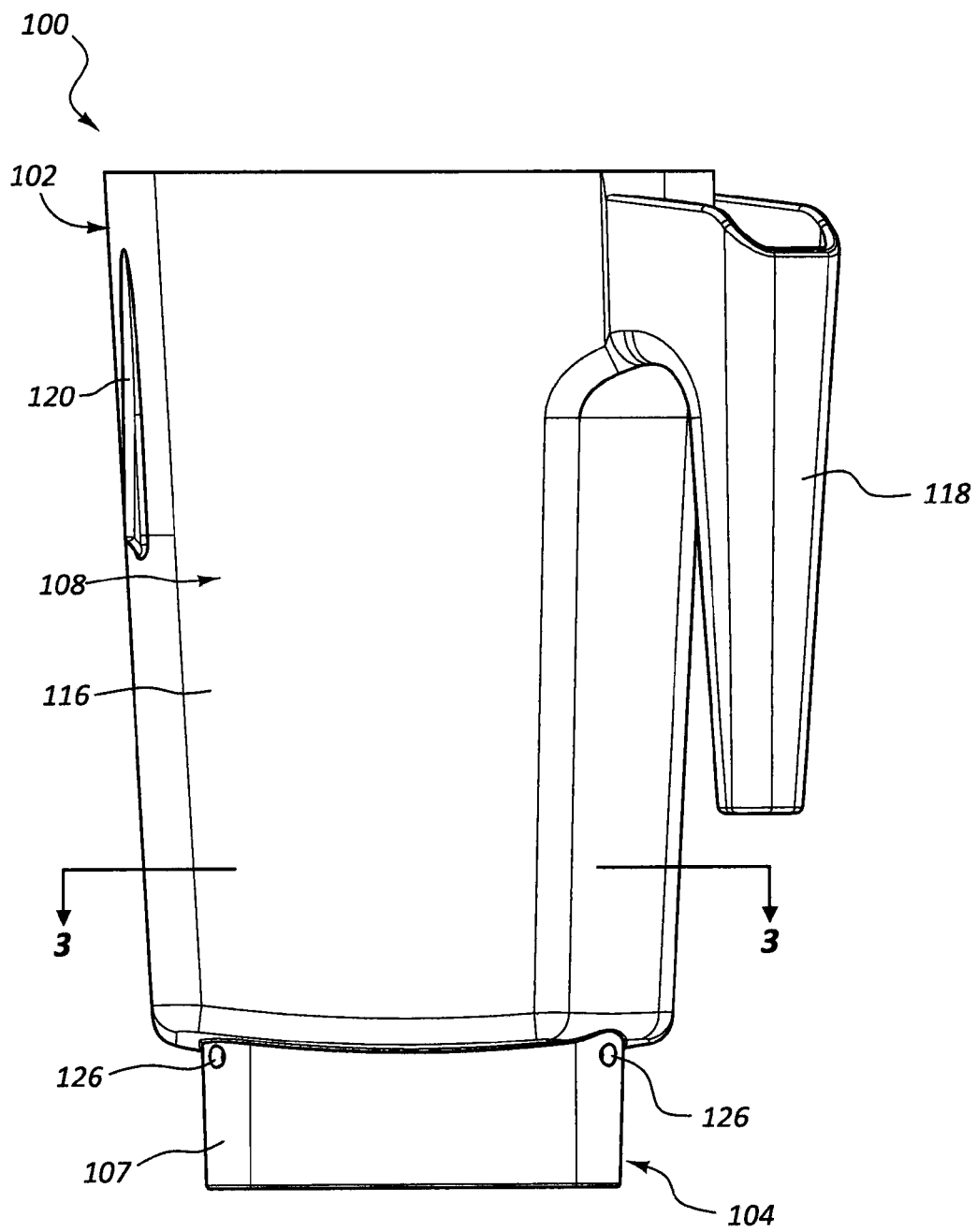
FIG. 1D shows a side view of the blender jar of FIGS. 1A-1B.
Figure 1E:
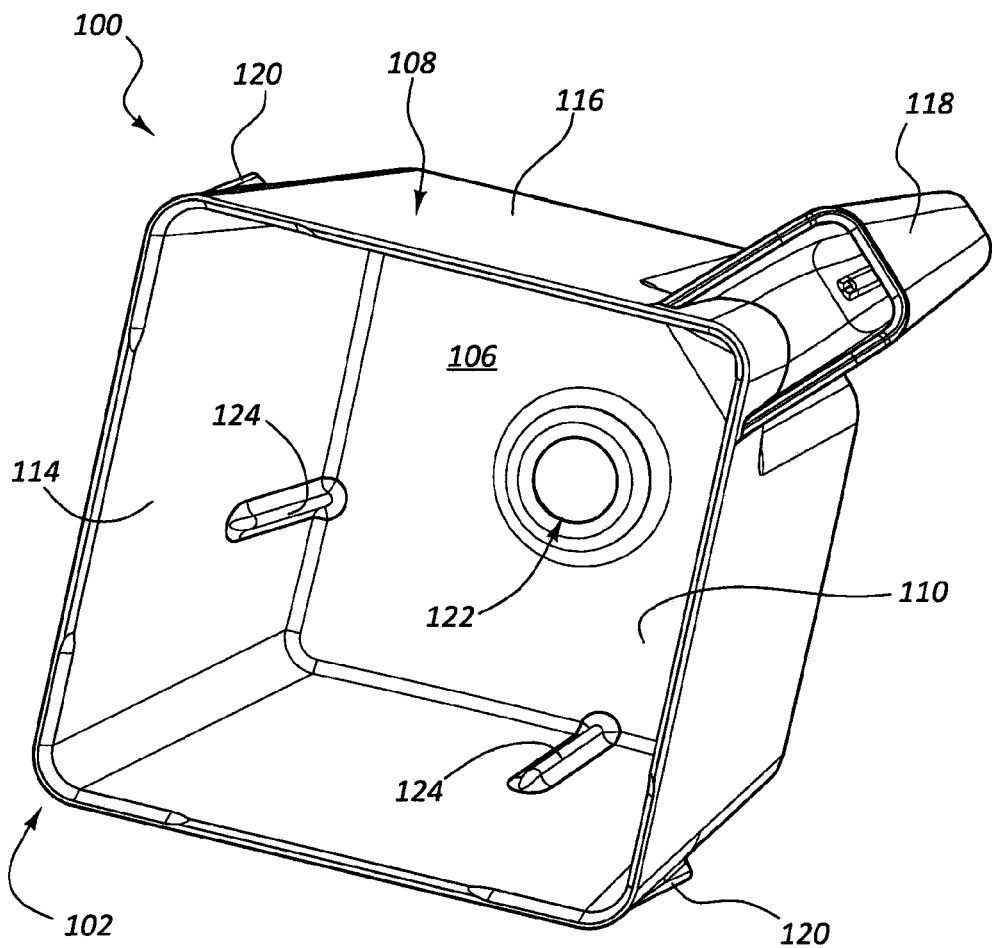
FIG. 1E shows a perspective view of the blender jar of FIGS. 1A-1B.

Referring now to the figures in detail, FIGS. 1A-1E show a blending jar 100 according to the present disclosure. FIG. 1A shows a top perspective view, FIG. 1B shows a bottom perspective view, FIG. 1C shows a top view, FIG. 1D shows a facial side view, and FIG. 1E shows a top corner perspective view.

The blending jar 100 may include a top end 102 and a bottom end 104. At or near the bottom end 104, a bottom wall 106 may extend across the jar 100 above or in connection with an attachment portion 107, and a sidewall 108 may extend upward from the bottom surface 106 to the top end 102. The bottom wall 106 may include an internal surface 110 and an external surface 112, and the sidewall 108 may include an internal surface 114 and an external surface 116. A handle 118 and external ridges 120 may be secured to or formed into the jar 100 near the top end 102 of the external surface 116 of the sidewall 108. The internal surface 110 of the bottom wall 106 may include a blade adapter portion 122, and the internal surface 114 of the sidewall 108 may have a plurality of internal ridges 124. The attachment portion 107 may include a plurality of vent holes 126.

Blending jar 100 may be configured to hold a volume of foodstuff in its internal mixing area bounded by the sidewall 108 and bottom wall 106. The blending jar 100 may be attachable to a blending base or motor housing at the attachment portion 107. The shape of the jar 100 may allow multiple blending jars to be stacked, with the attachment portion 107 of a jar being inserted within the sidewall 108 of another jar. In some embodiments, the bottom end 104 (i.e., the bottom wall 106 or attachment portion 107) may contact the internal ridges 124 to prevent the attachment portion 107 or other features at the bottom end 104 from becoming stuck within another jar. The blending jar 100 may be sized to fit on one or more blender base housings or blender bases and may have one of many internal volumes. For example, a typical blender jar 100 may have a three quart capacity, but the jar 100 may also have a greater or smaller internal volume. Various edges of the blender jar 100 may be rounded or filleted such as the intersection of faces of the sidewall 108 or the intersection of the internal surface 110 of the bottom wall 106 and the internal surface 114 of the sidewall 108.

Top end 102 of the blending jar 100 may be generally open and configured to connect to a lid (not shown). The top end 102 may receive the lid adjacent to the internal surface 114 of the sidewall 108 or the lid may extend or wrap around the external surface 116. The top end 102 may be wider than the bottom end 104 to accommodate a greater volume of foodstuff in the mixing area and to facilitate the movement of the foodstuff toward a blade attached at the blade adapter portion 122. The external ridges 120 extending from the external surface 116 of the sidewall 108 near the top end 102 may prevent stacked jars from getting stuck together by limiting the depth of penetration of the bottom end 104 of a jar into a receiving jar.

Bottom end 104 may be generally flat at the bottom of the attachment portion 107 to allow the jar 100 to be easily balanced upright when attached to a blender base or when freestanding. The attachment portion 107 of the bottom end 104 may be configured to couple with a blender base or motor housing in a position where the blade adapter portion 122 may be accessed by a drive shaft or other driver means configured to drive a blender blade near the bottom wall 106. While the attachment portion 107 shown in these figures has a generally square cross-section, the attachment portion 107 may alternatively be configured with any suitable surface shape and size to accommodate attachment to a blender base or housing. The attachment portion 107 may comprise a plurality of vent holes 126. The vent holes may provide stress relief for the corners of the attachment portion and may allow air to enter underneath the bottom wall 106 when the bottom of the attachment portion 107 would otherwise provide an airtight seal that would make lifting the jar 100 or removing the jar 100 from a blender or other retaining device or surface more difficult.

Bottom wall 106 spans the area between the sidewall 108 and the blade adapter portion 122. The bottom wall 106 may include a sloped surface (see, e.g., the bottom end 104 of FIG. 2), a rounded surface, a flat surface, an inverted pyramidal sloped surface, an inverted conical surface, or another desired shape known to those having skill in the art and the benefit of the present disclosure. The bottom wall 106 may be integrally formed with the sidewall 108 and the attachment portion 107 or may be removably attachable. The bottom wall 106, sidewall 108, attachment portion 107, and handle 118 may beneficially comprise a metal, polymer, or ceramic construction, such as, for example, glass, polycarbonate, or another similar material. Materials used may be at least partially transparent and allow users to view the contents of the jar 100 before and during mixing. If polymers are used, the materials may be light and Bisphenol A (BPA) free if desired. With a blending member (e.g., blade) (not shown) installed in the blade adapter portion 122, the bottom wall 106 and blending member may provide a watertight seal to the bottom of the jar 100 that may prevent fluids from escaping.

Figure 3A:
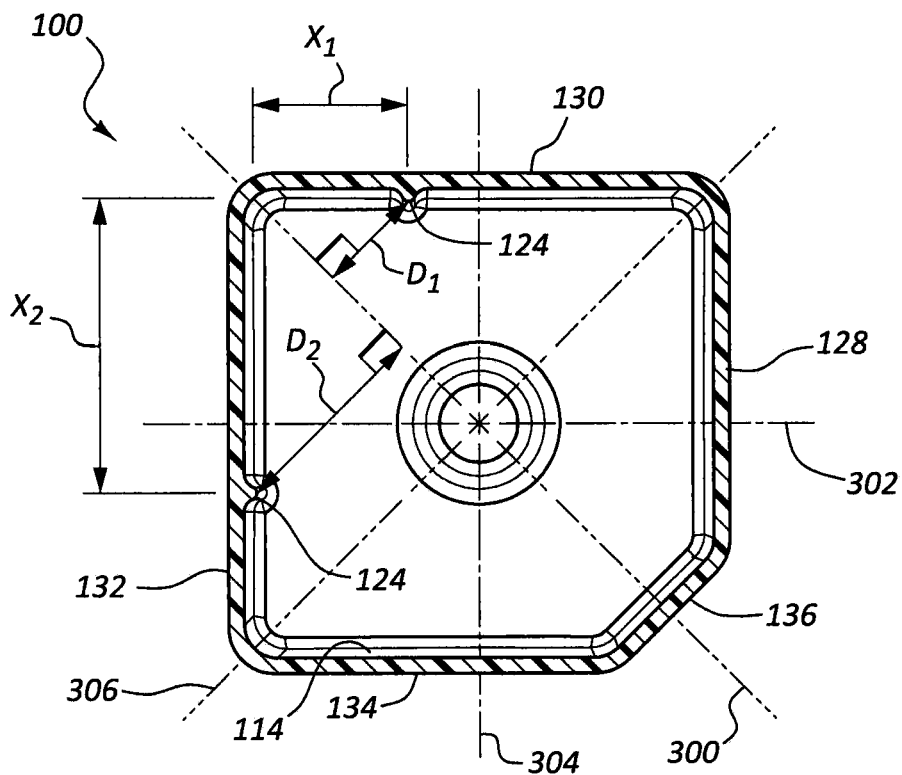
FIGS. 3A-3C are cross-sectional views of the blender jar of FIGS. 1A-1E taken through section lines 3-3 in FIG. 1D.
Figure 3B:
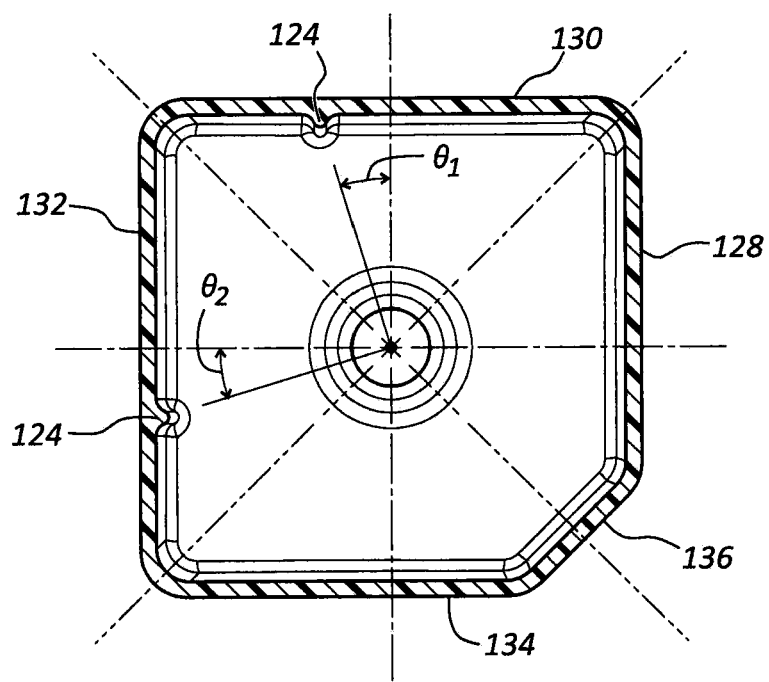

Sidewall 108 may extend upward from the bottom surface 106 to form a mixing volume or cup. In some embodiments, the sidewall 108 may include markings or graduations (not shown) to allow easier reference and measurement of the contents of the jar 100. The sidewall 108 may have a generally rectangular cross-section (see, e.g., FIGS. 3A-3B). For example, the sidewall 108 may have a generally square shape. In some embodiments, the corners of the rectangle or square shape may be rounded, filleted, or truncated. As shown in FIGS. 1C, 3A, and 3B, the sidewall 108 may comprise four side walls 128, 130, 132, 134 in a generally square configuration and a fifth truncated wall 136 extending between two of the four side walls 128, 134. The fifth truncated wall 136 is further described in U.S. Pat. No. 6,979,117 to Dickson, Jr., which is hereby incorporated by reference in its entirety. A fifth truncated wall may shift the vortex of materials in the blender jar to drive the materials in the jar 100 toward the blade assembly 202 more consistently. In other embodiments, the sidewall 108 may incorporate other cross-sectional shapes, such as, for example, triangular, pentagonal, hexagonal, octagonal, extended rectangular, circular/cylindrical, elliptical, star-shaped, clover-shaped, or another shape apparent to those having skill in the art and the benefit of the present disclosure. The shape of the cross-section may be limited based on an axis or plane of symmetry relative to the internal ridges 124, as described in further detail herein. A sidewall 108 having a generally rectangular cross-section may be beneficial over other shapes because it may provide a high amount of internal volume compared to cylindrical or octagonal jars having the same height and width.

The internal surface 110 and external surface 112 of the bottom wall 106 and the internal surface 114 and external surface 116 of the sidewall 108 may be generally smooth. This may allow the sidewall 108 and bottom wall 106 to be more transparent. Additionally, this may allow the jar 100 to be more easily cleaned and manufactured. In some embodiments, the internal surfaces 110, 114 may comprise minor waves or alternating ridges and grooves and still may be considered smooth. Generally, if they are present, these waves or ridges and grooves may have a groove-to-ridge peak depth less than the thickness of the sidewall 108. Thus, smooth ridges or waves at the internal surfaces 110, 114 may not be considered equivalent to internal ridges 124 according to these embodiments of the present disclosure.

Handle 118 may extend from the external surface 116 of the sidewall 108. For example, the handle 118 may extend from the top end 102 at a fifth truncated wall 136, as shown in FIG. 1A. The handle 118 may improve convenience in carrying and pouring the jar 100. The handle 118 may be integrally molded with the sidewall 108 or may be attached thereto. Additionally, the handle 118 may have an opening at the top end 102 of the jar 100 to allow it to nest within other handles when jars are stacked. At the bottom end of the handle 118, a hole may be formed. This hole may be used to drain buildup of waste within the handle 118.

Blade adapter portion 122 may be a hole or other opening in the bottom wall 106 that allows a removable blender blade assembly to be coupled with the jar 100 adjacent to the bottom wall 106. See FIGS. 1C, 2, 3C, and 4. The blade adapter portion 122 may also allow a blending blade assembly to receive a drive shaft from a motor positioned below the bottom wall 106 (e.g., in a blender base or motor housing). In some embodiments, a blending blade may be integrated with or permanently attached to the bottom wall 106, and the blade adapter portion 122 may thus be integrally formed with the blade and bottom wall instead of providing an opening through the bottom wall 106.

A central axis or central vertical axis 200 of the blender jar 100 may extend through the blade adapter portion 122 or a central position of the bottom wall 106. See FIG. 2. In embodiments having four side walls 128, 130, 132, 134 and a fifth truncated wall 136, the central axis may be defined by the intersection of two planes orthogonal to the side walls 130, 132 that are not adjacent to the fifth truncated wall 136, such as planes 302, 304 in FIG. 3A. The fifth truncated wall 136 may be positioned nearer to the central axis 200 than other corners of the sidewall 108. This thereby creates a beveled or angled surface in the sidewall 108.

Figure 2:
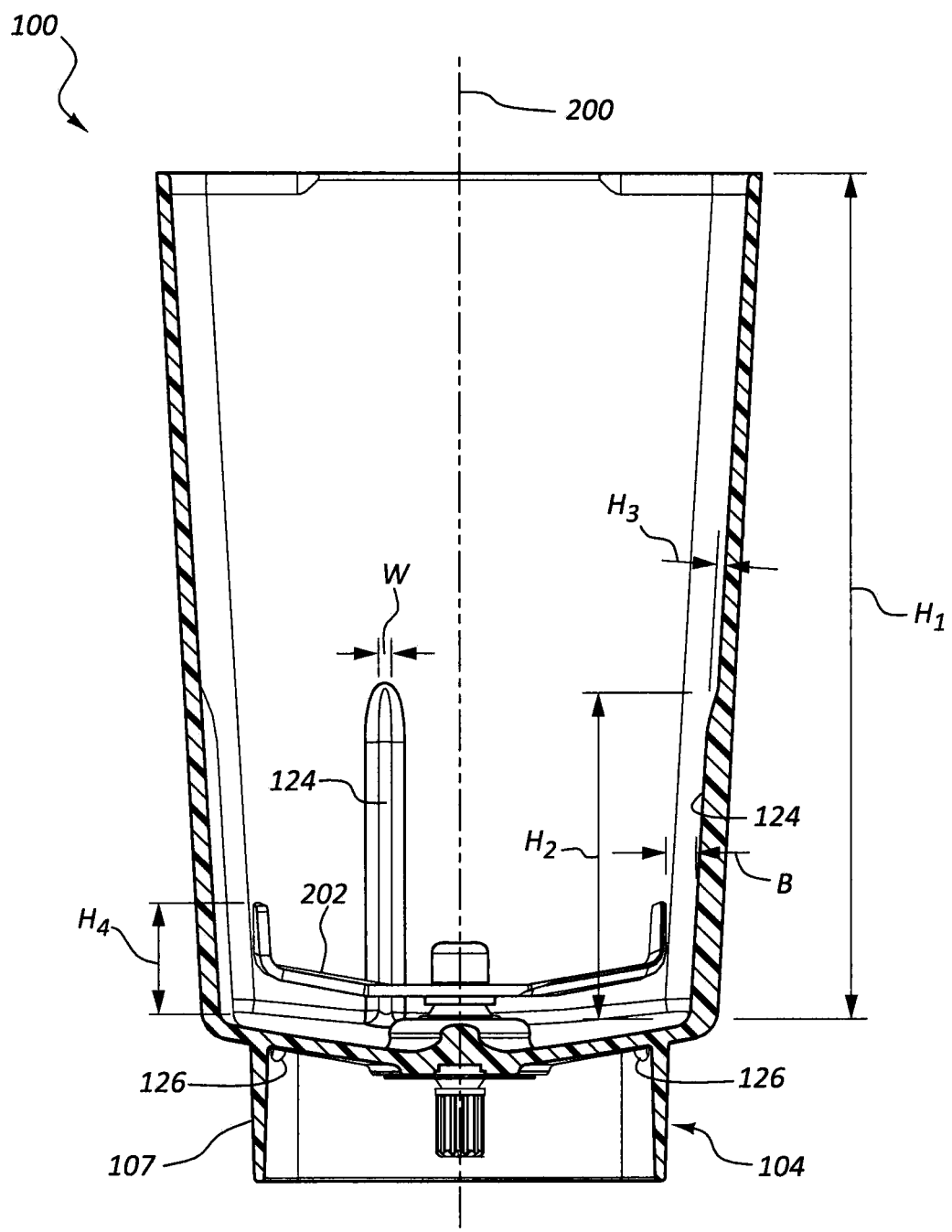
FIG. 2 is a cross-section of the blender jar of FIGS. 1A-1E taken through section lines 2-2 in FIG. 1C and showing a blade assembly installed in the blender jar.

The plurality of internal ridges 124 on the internal surface 114 of the sidewall 108 may extend inward from the internal surface 114. See height $H_3$ in FIG. 2. For example, the internal ridges 124 may extend toward a central axis 200 of the blender jar 100 or toward an opposite side of the sidewall 108. The internal ridges 124 may also extend into contact with, or may be molded with or filleted into, the bottom wall 106. In some embodiments, the internal ridges 124 may extend generally perpendicular to the sidewall 108, and in some embodiments they may extend toward the central axis 200 or another point within the jar 100. The internal ridges 124 may extend into the jar 100 to a height of about the thickness of the sidewall 108. As illustrated in FIG. 2, in some embodiments, the internal ridges 124 may extend to a height $H_3$ measured from the sidewall 108 of between about 0.09 inches and about 0.25 inches relative to nearby internal surface 114 areas, and to about 0.15 inches for a 3-quart square jar (i.e., about 80-ounce maximum capacity jar) or other comparable jar. On a wavy or undulating sidewall (e.g., as discussed supra), the height of the internal ridges 124 may be measured from a peak of a ridge or the bottom of a groove of the undulating surface adjacent to the internal ridge 124. The width W of the internal ridges 124 may be comparable to its height $H_3$ relative to the inner surface 114 of the sidewall 108, being about 0.090 inches to about 0.360 inches across, and being about 0.117 inches across for a 3-quart square jar or other comparable jar.

In some embodiments, the internal ridges 124 may be filleted, beveled, or tapered relative to the surrounding surfaces 110, 114. The fillets or bevels may help prevent foodstuff from being lodged into corners at the internal ridges 124, thereby improving flow, allowing the internal ridges 124 to divert flow as intended (since buildup does not accumulate and change its flow profile). The fillets and bevels may also make the internal ridges 124 easier to clean and more resistant to wear and breaking. In some embodiments, the internal fillet radius may be about 0.125 inches for a 3-quart square jar or other comparable jar. The top of an internal ridge 124 may also be filleted. For example, the external fillet radius may be about 1.12 inches for a 3-quart square jar or other comparable jar. This increased radius may prevent accumulation of material on top of the ridge 124.

The internal ridges 124 may be positioned asymmetrically on the internal surface 114 of the sidewall 108. As shown in FIGS. 1C, 3A, and 3B, the internal ridges 124 may be positioned on two side walls 130, 132 away from the center lines of the widths of those walls. In these embodiments, the internal ridges 124 are positioned at different distances $D_1$, $D_2$ from a diagonal plane 300 generally bisecting the jar 100 by extending through the handle 118 and the intersection of side walls 130, 132. In this manner, the positioning of the internal ridges 124 may be defined as non-reflectively symmetrical, since the positioning of the ridges 124 is not reflected on the side walls 130, 132 when compared across the otherwise bisecting diagonal plane 300. This diagonal plane 300 may also be referred to generally as a plane diagonally bisecting the generally rectangular cross-section shown in FIG. 3A. In other embodiments, the internal ridges 124 may be non-reflectively symmetric relative to a plane 302 or 304 extending centrally through the width of one of the side walls 130, 132 or another diagonal plane 306. In other embodiments, the asymmetry of the internal ridges 124 may be defined by their having different positions relative to a corner or vertex of the cross-section of the jar 100, such as the internal ridges 124 of FIG. 3A having different distances $X_1$, $X_2$ relative to the corner between side walls 130, 132. In other embodiments, the internal ridges 124 may be asymmetrically positioned relative to the fifth truncated wall 136. For example, each of the ridges 124 may be positioned at a different horizontal distance measured between a centerline of the fifth truncated wall 136 and the centers of the ridges 124.

The internal ridges 124 may deflect, redirect, disrupt, or displace motion and flow of foodstuff, fluids, and other materials in the jar 100 as the blender is operated. The non-reflectively symmetric positioning of the ridges 124 may thus cause the flow and motion of these materials to be reflectively asymmetric. The reflective asymmetry may introduce turbulence to the motion of these materials and increase the probability that the materials will come into contact with the blade rather than being swept around the blade or into a neutral portion of the jar 100 by the flow. In some embodiments, the internal ridges 124 may be positioned such that at least a portion of the flow having an anticipated speed and viscosity will come into contact with the ridges 124 and then will be redirected toward a point providing improved mixing (e.g., toward the blade or center of the jar 100) instead of naturally flowing toward a corner or edge of the jar 100. The ridges 124 themselves may also, provide an additional impact surface for materials in the jar 100 being swept by the flow. Thus, in some embodiments, the number of and position of the ridges 124 may depend upon anticipated flow characteristics of the materials mixed in the jar 100. In one example, flow may be uninterrupted by ridges 124 on a portion of the jar, such as along side walls 128, 134, 136, to allow the flow to have desired characteristics upon reaching the portions of the jar 100 having the internal ridges 124. In these embodiments, a fifth truncated wall 136 may be beneficially designed to accelerate flow toward the ridges 124 rather than allowing the flow to lose energy, as would be the case if the fifth truncated wall 136 were omitted.

In some arrangements, the internal ridges 124 may be rotationally symmetric. For example, in the embodiment shown in FIG. 3B, the internal ridges 124 each have a rotated angle $\theta_1$, $\theta_2$ measured from an orthogonal pair of axes equally dividing the walls 130, 132 on which the internal ridges 124 are positioned. Alternatively, the orthogonal axes may be rotated around the center of the jar 100 to another arbitrary angle, and the rotated angle of the internal ridges 124 may be defined by rotation from those axes.

The shape of an internal ridge 124 may not be symmetric across a plane bisecting the internal ridge. For example, the internal ridge 124 may have a beveled side and a filleted side. If the internal ridges 124 are not symmetric in this manner, the shape of the ridges 124 may be rotationally symmetric as described in connection with the rotational symmetry of the positioning of the ridges 124 above. In one example embodiment, the profile of each point along the internal surface of an internal ridge 124 may have a corresponding rotationally symmetric point on one other internal ridge 124 in the jar 100.

The internal ridges 124 may also be configured to be non-rotationally symmetric. Thus, the ridges 124 of FIG. 3B may have different rotated angles $\theta_1$, $\theta_2$ establishing their positioning. The ridges 124 may also have internal surface profiles that are not rotationally symmetric, such as beveled edges that face the intersection of side walls 130 and 132 and filleted edges that face away from that intersection. In some embodiments, the positioning of the internal ridges 124 may be rotationally symmetric for the centers of the ridges 124, but the surface profiles of the ridges 124 may not be entirely rotationally symmetric.

Two internal ridges 124 are shown on the internal surfaces 114 of the jar 100 in the figures. In other embodiments, more internal ridges 124 may be disposed in the jar 100, such as on side walls 128, 134, or 136. Additional internal ridges 124 may be formed on the side walls 130, 132 as well. The number and positioning of the ridges 124 may depend upon design considerations such as the size of the jar 100, the size, shape, and position of a blade or blade adapter portion 122 within the jar, the type of foodstuff or other items to be blended or mixed, and cosmetic or economic considerations.

The internal ridges 124 may extend along the entire height of the sidewall 108 or may extend only partially along the sidewall 108. The height of the sidewall 108 may be defined as height $H_1$ in FIG. 2, and the height of an internal ridge 124 may be height $H_2$. Thus, $H_1$ may be greater than or equal to $H_2$. In a preferable embodiment, $H_2$ may be less than half of $H_1$, as shown in FIG. 2. For example, height $H_2$ may be between about 1.50 inches and about 4.50 inches long, and between about 2.75 to about 3.25 inches long. Likewise, $H_1$ may be between about 5.00 inches and about 9.00 inches long, and between about 6.50 inches and about 8.00 inches long. Flow of material in the jar 100 may thus be beneficially unaltered by ridges in the top portions of the jar 100, but may be affected by the ridges 124 once the material circulates lower into the jar 100. The flow of material through the jar 100 may thus be designed to introduce interference from the ridges 124 (e.g., turbulence) for selected depths of the jar, as desired by the designer.

As shown in FIG. 2, the height $H_4$ of the blade assembly 202 may be equal to or less than the height $H_2$ of the internal ridges 124. In this configuration, the blade assembly 202 may receive a large amount of the flow redirected away from the internal ridges 124. In another embodiment, the height $H_2$ of the internal ridges 124 may be less than the height $H_4$ of the blade assembly 202. In this manner, only the flow of ingredients next to or below the blade may be directly affected by interaction with the internal ridges 124. This may be advantageous in blender jars intended to be used in conjunction with materials that tend to settle in the jar 100 while being mixed or when the effect of the ridges 124 is diminished as compared to longer ridges. In an exemplary embodiment, height $H_4$ may be between about 1.00 inches and about 2.00 inches, and more between about 1.125 inches and about 1.50 inches.

The height $H_3$ of the internal ridges 124 relative to the internal surface 114 from which they extend may taper or vary along the height of the sidewall 108. While the figures show the ridges 124 disposed extending from the bottom wall 106 along internal surface 114, the ridges 124 may also be arranged extending downward along the internal surface 114 from the top end 102 of the jar and/or along a middle portion of the internal surface 114 without reaching the top end 102 or bottom wall 106. In some arrangements, the internal ridges 124 may not be vertical, but may be partially or wholly slanted or curved along the sidewall 108.

Figure 3C:
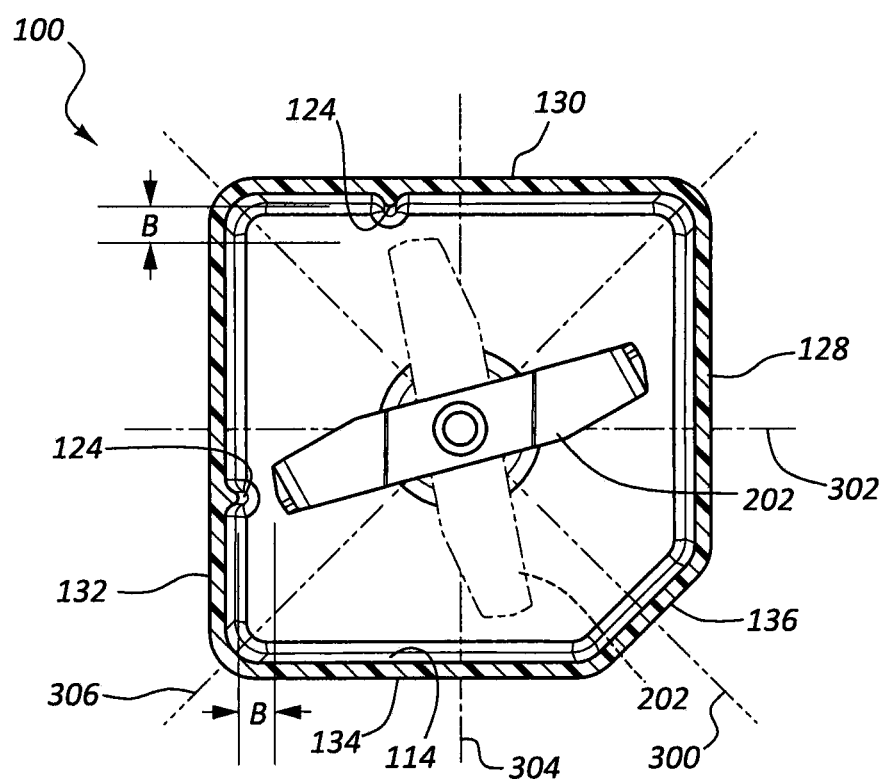

FIG. 3C shows a cross-sectional view of the jar 100 (taken along section lines 3-3 in FIG. 1D) showing a blade assembly 202 attached at the blade adapter portion 122 of the jar 100. A blade assembly 202 that is rotated proximate to the ridge 124 on side wall 130 is shown in phantom lines. Width B indicates the distance between the peak or tip of an internal ridge 124 and the end of the blade assembly 202 when the blade assembly 202 is rotated close to the internal ridge 124. In one embodiment, the width B for some internal ridges 124 may be different from other internal ridges. In another arrangement, width B may be equal to a width between the tip of the blade assembly 202 and a centerline of an inner surface 114 of the sidewall on which the ridge 124 is positioned when the blade assembly 202 is aligned with that centerline. The internal ridges 124 may be asymmetrically positioned within the jar 100 due to having a different width B (i.e., a different distance from the blade assembly 202) for different individual ridges 124.

Figure 4:
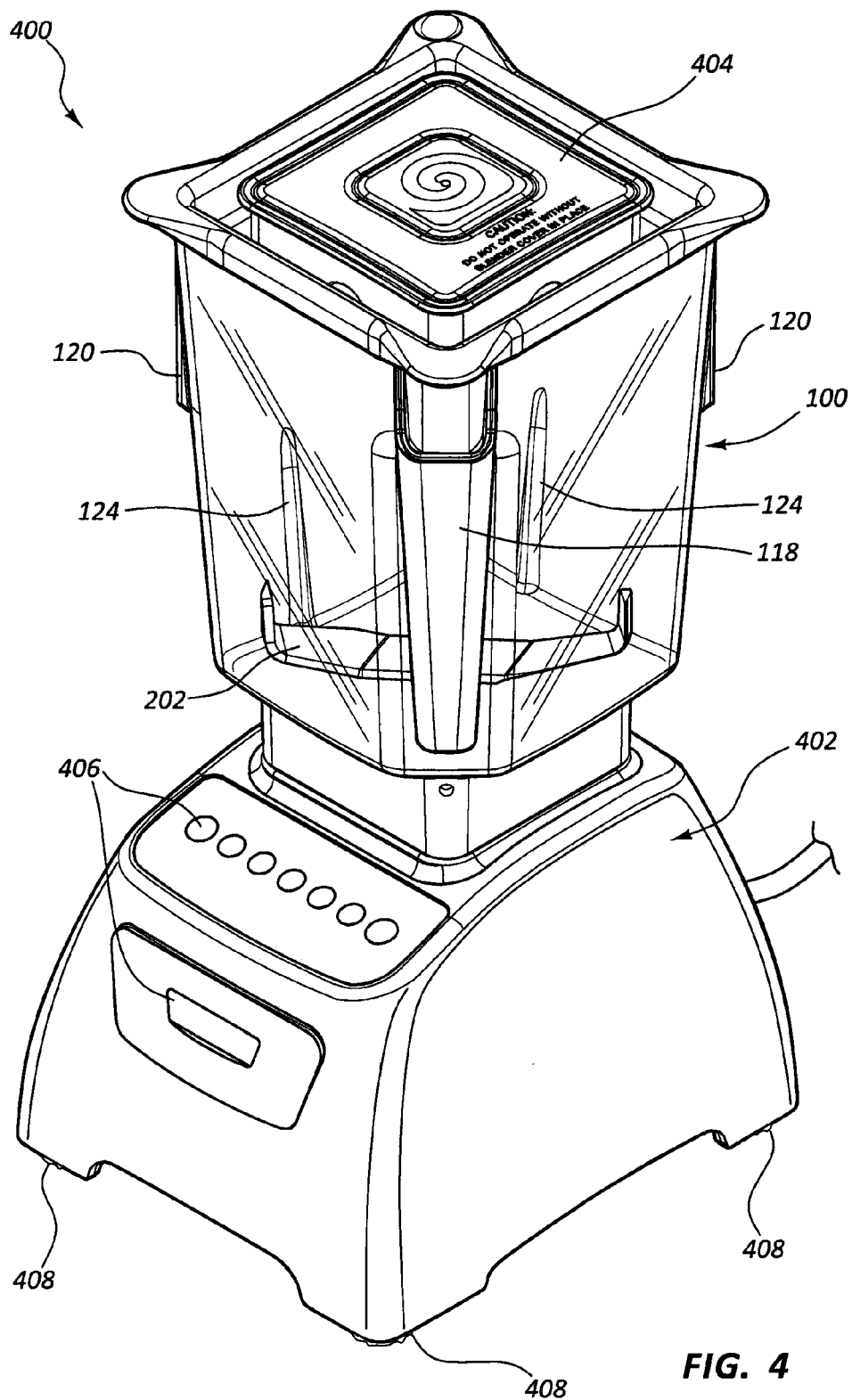
FIG. 4 is an illustration of a blender according to an embodiment of the present disclosure.

FIG. 4 shows an assembled blender apparatus 400 comprising a blender jar 100, blender base 402, and jar lid 404. The blender jar 100 is attached on top of the blender base 402, and the jar lid 404 is partially inserted into the top end of the jar 100. The blender base 402 may comprise a housing for a motor (not shown) to drive rotation of a blade assembly 202 within the blender jar 100. Thus, the blender jar 100 may attach to or couple with the top of the blender base 402 so that a drive shaft or other driving means may be connected between the motor and the blade assembly 202. Controls 406 may be available from the exterior of the blender base 402. These controls 406 may manage the speed and duration of blending, direction of blade rotation, and other related functions. The controls 406 may also provide information to the user. The blender base 402 may have legs 408 to stabilize the blender 400 while in use. Thus, the legs 408 may be configured to absorb vibrations of the motor or other blender components and to keep the blender base 402 from making other unintended movements. The blender base 402 may comprise a standalone unit as shown in FIG. 4, or may be part of a larger unit (e.g., a housing configured to simultaneously receive a blender jar and a mixing bowl or other similar device). Thus, the present disclosure is not limited to the particular embodiment shown, which is intended to merely be representative of one potential application of the principles disclosed herein.

Another aspect of the present disclosure is a method of blending foodstuff using a ridged blending jar. The method may comprise providing a blender having a motor, a housing, a blending jar coupled to the housing, and a movable blending member within the blending jar. The blending jar may have internal ridges asymmetrically protruding from an inner surface of the blending jar. Foodstuff may be deposited into the blending jar, and the foodstuff may be blended within the jar using the blade assembly and motor such that, while blending, motion of at least some of the foodstuff may be deflected or redirected by the ridges.

The motion of at least some of the foodstuff may be deflected or redirected by the ridges in a non-reflectively, symmetrical manner (i.e., a reflectively asymmetric manner) relative to the blending jar. The motion of at least some of the foodstuff may however be deflected or redirected in a rotationally symmetric or rotationally asymmetric manner relative to the blending jar.

The motion of at least some of the foodstuff may not be deflected or redirected by the ridges along a portion of the height of the blending jar. In some embodiments, this means that the motion may only be deflected or redirected by the ridges within a certain depth of the blending jar.

In another embodiment, the blending jar may comprise four side walls extending from a bottom wall (e.g., extending upward) that form a generally rectangular cross-section and a fifth truncated wall disposed between two of the four side walls. The fifth truncated wall may be positioned closer to a central axis of the blending jar than corners of the generally rectangular cross-section. In this method, the motion of the at least some of the foodstuff may be deflected or redirected by the fifth truncated wall in addition to the ridges. Other walls may also or alternatively be designed to direct flow of foodstuff toward ridges.

Using apparatuses and methods disclosed herein may improve blender performance by reducing blending time and/or improving the consistency and uniformity of ingredients blended. Proof-of-concept tests were conducted to evaluate the effectiveness of a ridged blender jar against a comparable non-ridged blender jar. Each jar had equivalent external and internal dimensions, blending blade assembly, and blender base/motor driving the blade assembly. Each jar was tested using a variety of representative recipes, including grinding wheat, and making strawberry smoothies and vanilla bean frappuccinos. Two cups of wheat were ground in a 12-second continuous cycle. The strawberry smoothie recipe included 250 g of frozen strawberries, 150 g of strawberry syrup, 200 g of water, and 150 g of ice that were blended in a 12-second Starbucks® cycle of a Blendtec® Stealth® motor. The frappuccino included 221 g of base mix, 252 g of ice, and 20 g vanilla bean powder, all blended in a 12-second Starbucks® cycle. The recipes were each blended as specified above, then the mixture was processed through a sieve (#10 sieve for the wheat, and #5 sieve for strawberry smoothie and frappuccino). The remnants after sifting by the sieve were weighed to compare the effectiveness of the ridged and non-ridged jars. The average mass of the remnants (in grams) after multiple test runs is set forth in the following table along with the percent reduction in remaining mass. As shown in these results, a ridged jar shows significant improvement over a non-ridged blender jar for each type of test recipe, so the ridged jar improves a more uniform blend over an equal amount of blending time.

| Test Jar | Wheat | Strawberry Smoothie | Vanilla Bean Frappuccino |
| --- | --- | --- | --- |
| Non-ridged Jar | 30.5 g | 41.4 g | 4.9 g |
| Ridged Jar | 29.2 g | 31.2 g | 2.8 g |
| Reduction in Mass of Remnants | 4.26% | 24.6% | 42.9% |

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A ridged blender jar for improving blending consistency and conformity, the blender jar comprising:
   a bottom wall configured to be positioned below a movable blending member, the movable member having an axis of rotation;
   an internal sidewall surface comprising at least four planar side walls extending from the bottom wall and upward relative to the bottom wall, the bottom wall and internal sidewall surface forming a mixing area, the internal sidewall surface having an upper opening;
   the internal sidewall surface further comprising a plurality of ridges extending inward from the internal sidewall surface, the plurality of ridges extending upward from the bottom wall and inward toward the mixing area of the jar, the plurality of ridges being positioned reflectively asymmetric relative to any vertical plane extending through the axis of rotation of the movable blending member.

2. The blender jar of claim 1, wherein the four side walls form a generally rectangular cross-section.

3. The blender jar of claim 2, wherein the sidewall further comprises a fifth truncated wall disposed between two side walls of the sidewall surface, the fifth truncated wall being positioned closer to the axis of rotation.

4. The blender jar of claim 1, wherein the plurality of ridges extends along the sidewall surface from the bottom wall to a height less than half a total height of the mixing area.

5. The blender jar of claim 4, wherein the height of the plurality of ridges is greater than or equal to a height of the movable blending member when the movable blending member is installed in the bottom wall.

6. The blender jar of claim 1, wherein the blender jar has no more than two ridges.

7. The blender jar of claim 1, wherein the plurality of ridges extends into the mixing area to a distance greater than or equal to a thickness of the sidewall.

8. The blender jar of claim 1, wherein the plurality of ridges has a width greater than or about equal to a thickness of the sidewall.

9. The blender jar of claim 1, wherein the plurality of ridges is filleted or tapered relative to the mixing area.

10. A ridged blender jar, comprising:
a bottom wall configured to be positioned below a movable blending member, the movable member having an axis of rotation;
a plurality of internal sidewalls extending from the bottom wall and upward relative to the bottom wall, the bottom wall and the plurality of internal sidewalls forming a mixing area;
the internal sidewalls further comprising a plurality of ridges extending inward from the plurality of internal sidewalls, the plurality of ridges extending upward from the bottom wall and inward toward the mixing area of the jar, the plurality of ridges being positioned reflectively asymmetric relative to a vertical plane extending centrally through at least one of the plurality of internal sidewalls and through the axis of rotation.

11. The ridged blender jar of claim 10, wherein the plurality of ridges comprises no more than two ridges.

12. The ridged blender jar of claim 10, wherein the plurality of ridges has a width greater than or equal to a thickness of the sidewall.

13. The ridged blender jar of claim 10, wherein the plurality of ridges are rotationally asymmetric relative to the axis of rotation of the movable blending member.

14. The ridged blender jar of claim 10, wherein the plurality of ridges are positioned at different distances from a corner of the plurality of internal sidewalls.

15. The ridged blender jar of claim 10, wherein the plurality of ridges are asymmetrically positioned relative to a truncated wall of the plurality of internal sidewalls.

* * * * *